United States Patent
Hartley

(10) Patent No.: US 9,838,871 B2
(45) Date of Patent: Dec. 5, 2017

(54) SOCIAL ACCESS CONTROL SYSTEM

(71) Applicant: PREMPOINT INC., Delray Beach, FL (US)

(72) Inventor: Matthew W. Hartley, Delray Beach, FL (US)

(*) Notice: Subject to any disclaimer, the term of this patent is extended or adjusted under 35 U.S.C. 154(b) by 358 days.

(21) Appl. No.: 14/842,922

(22) Filed: Sep. 2, 2015

(65) Prior Publication Data
US 2016/0192190 A1    Jun. 30, 2016

Related U.S. Application Data

(60) Provisional application No. 62/096,990, filed on Dec. 26, 2014, provisional application No. 62/208,018, filed on Aug. 21, 2015.

(51) Int. Cl.
*G06F 15/173* (2006.01)
*H04W 12/06* (2009.01)
*H04W 4/02* (2009.01)

(52) U.S. Cl.
CPC .......... *H04W 12/06* (2013.01); *H04W 4/023* (2013.01)

(58) Field of Classification Search
USPC ....... 709/203, 206, 217, 219, 223, 224, 226, 709/228, 231, 232, 238; 725/131; 463/42; 370/252, 336
See application file for complete search history.

(56) References Cited

U.S. PATENT DOCUMENTS

| | | | | |
|---|---|---|---|---|
| 9,787,778 | B2 * | 10/2017 | Agarwal | H04L 67/16 |
| 2008/0216145 | A1 * | 9/2008 | Barton | H04N 7/1675 725/131 |
| 2014/0240087 | A1 | 8/2014 | Liu et al. | |
| 2014/0274407 | A1 * | 9/2014 | Calippe | H04L 67/10 463/42 |
| 2015/0219742 | A1 * | 8/2015 | Castagnoli | H04W 4/02 370/336 |
| 2015/0222507 | A1 * | 8/2015 | Choy | H04L 43/0811 370/252 |
| 2016/0267773 | A1 * | 9/2016 | Martin | G08B 25/004 |

* cited by examiner

Primary Examiner — Quang N Nguyen
(74) Attorney, Agent, or Firm — Patents on Demand P.A.; Brian K. Buchheit

(57) ABSTRACT

An access control system comprised of access points and a social access control system. The access points can be communication intermediaries for accessing an associated entity. The social access control system can be configured to limit interactions with the access point to mobile devices associated with members of a social access control network as defined by an owner of the access point. The owner can be a member of the social access control network. The mobile device can be required to be within a physical proximity, defined by the owner, of the access point. The mobile devices of members of the social access control network lacking an association with the access point can be unable to perform interactions that affect the entity of the access point when within the physical proximity.

17 Claims, 7 Drawing Sheets

SOCIAL ACCESS CONTROL SYSTEM

CROSS-REFERENCE TO RELATED APPLICATIONS

This is a utility patent that converts (and claims the benefit of) U.S. provisional application 62/096,990 filed on 26 Dec. 2014 and U.S. provisional 62/208,018 filed on 21 Aug. 2015. U.S. provisional applications 62/096,990 and 62/208,018 are incorporated by reference herein in their entirety.

BACKGROUND

The present invention relates to the field of security and, more particularly, to a social access control system.

The continuous expansion of content and networked devices in our daily lives has become commonplace, fueled by popular social media services like FACEBOOK and YOUTUBE. Emerging wireless communication technologies, such as low-energy BLUETOOTH, coupled with low-cost hardware are poised to further interject digital data in obscure and under-utilized areas.

The ability to introduce data content into localized areas will continue to encounter the same challenges as traditional data broadcast systems like data management, security, access control, and monitoring. Attempts to address these foreseeable challenges, such as that taught in U.S. Patent 20140240087, fail to describe an end-to-end security model. For example, U.S. Patent 20140240087 does not address the issue of identifying the person prior to granting access to a door via the user's mobile device.

What is needed is a solution that utilizes multiple means of authentication to limit access to the data or entities secured by personal access points to only those persons defined by the owner of the access point. Such a solution should utilize multiple disciplines and incorporate known standards.

BRIEF SUMMARY

One aspect of the present invention can include an access control system comprised of access points and a social access control system. The access points can be communication intermediaries for accessing an associated entity. The social access control system can be configured to limit interactions with the access point to mobile devices associated with members of a social access control network as defined by an owner of the access point. The owner can be a member of the social access control network. The mobile device can be required to be within a physical proximity, defined by the owner, of the access point. The mobile devices of members of the social access control network lacking an association with the access point can be unable to perform interactions that affect the entity of the access point when within the physical proximity.

The social access control system can be configured to limit interactions of the access point to mobile devices associated with members of a social access control network as defined by an owner of the access point. The owner can be a member of the social access control network. The mobile device can be capable of communicating with the access point and can be required to be within a physical proximity, defined by the owner, of the access point. The physical proximity can be within the localized transmission range. Members of the social access control network lacking an association with the access point can be unable to perform interactions that affect the entity of the access point when within the physical proximity.

Another aspect of the present invention can include an access control method. Such a method can begin with the authentication of identification data by a social access control system to determine membership of a user in a social access control network. The identification data can be entered in a social access client application operating on a mobile device of the user. The social access control network can be comprised of members and access points. An access point can be a communication intermediary to an entity at a geospatial location. When the user's identification data is valid, the physical location of the mobile device can be obtained. Access points that are within a predefined area of the mobile device can then be identified. Interactions allowed for the user with the identified access points can be ascertained based upon the access point definition associated with the access point. The user can be permitted to perform the ascertained interactions with the access point via the social access client application based upon a physical proximity of the mobile device to the geospatial location of the access point. The physical proximities required to perform an interaction can be established in the access point definition. The performance of interactions with the access point can be disallowed without the social access client application.

Yet another aspect of the present invention can include a computer program product that includes a computer readable storage medium having embedded computer usable program code. The computer usable program code can be configured to authenticate identification data provided by a user to determine membership in a social access control network. The identification data can be received from a mobile device of the user. The social access control network can be comprised of members and access points. An access point is a communication intermediary for accessing an entity. The computer usable program code can be configured to, when the identification data is valid, obtain the physical location of the mobile device. The computer usable program code can be configured to identify access points that are within a predefined area of the mobile device. The computer usable program code can be configured to ascertain interactions allowed for the user with the identified access points based upon an access point definition associated with the access point. The computer usable program code can be configured to permit the user to perform ascertained interactions with the access point based upon a physical proximity of the mobile device to the geospatial location of the access point. The physical proximities required to perform an interaction can be established in the access point definition. Performance of interactions with the access point can be disallowed using other means.

DETAILED DESCRIPTION

Figure 1:
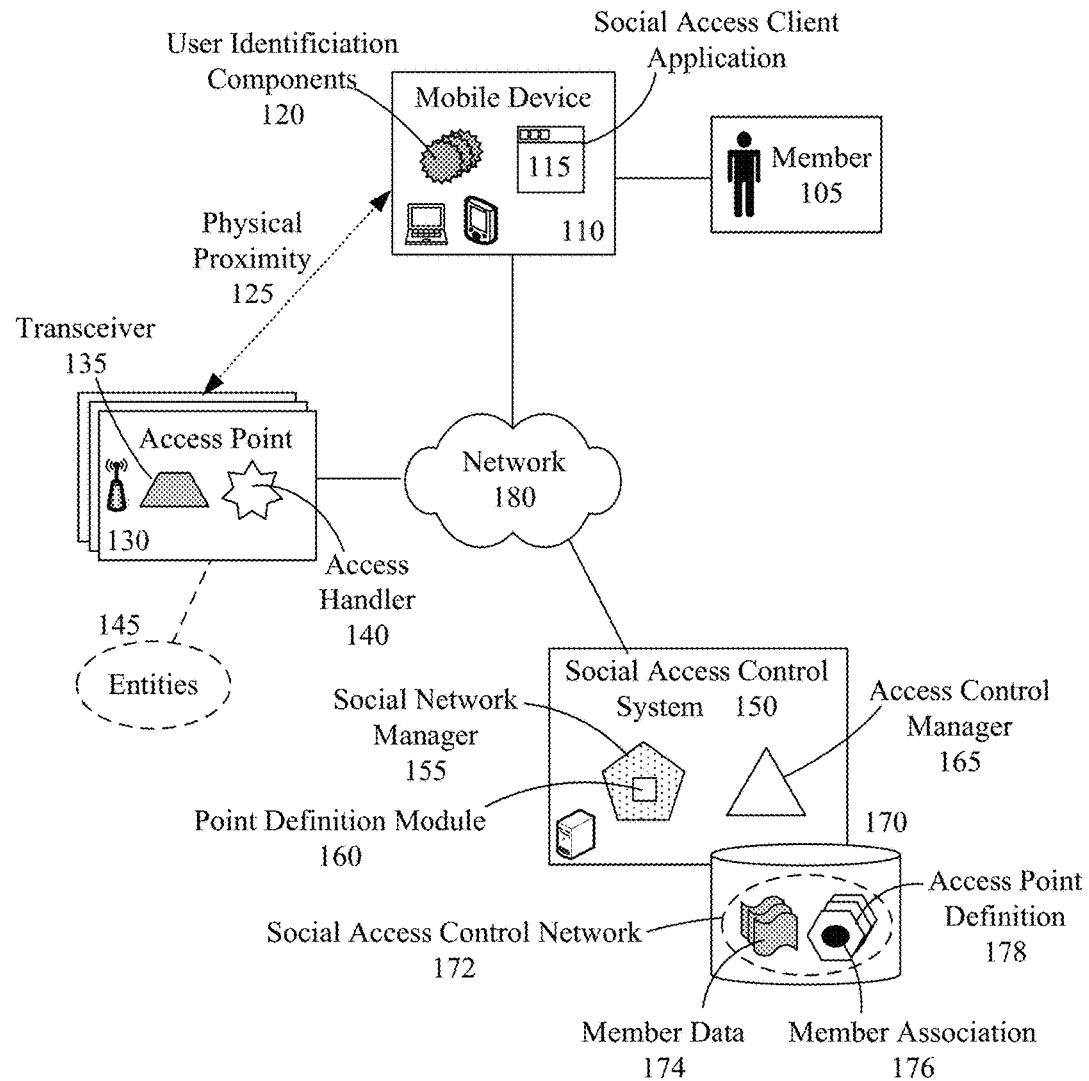
FIG. 1 is a schematic diagram illustrating a system that utilizes a social access control system to limit access to the entities associated with an access point in accordance with embodiments of the inventive arrangements disclosed herein.

The present invention discloses a solution for restricting interaction with localized access points and their associated entities. An access point can be a wireless electronic device that mitigates interaction with its entities like data files or another computing system. The social access control system can utilize a social access control network to restrict interaction with the access points to only those members of the social access control network that have be given access by the owner of the access point. Interaction with the access point can require communication between the social access client application of the social access control system and the access point within a predefined physical proximity. The social access client application can operate upon a mobile device of the member.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and scripting languages like JavaScript, Python, PERL, and the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that utilizes a social access control system 150 to limit access to the entities 145 associated with an access point 130 in accordance with embodiments of the inventive arrangements disclosed herein. In system 100, a member 105 can use the social access control system 150 to interact with entities 145 secured by an access point 130 owned by another member 105 of the social access control network 172.

A member 105 can be a real person that is registered with the social access control system 150; meaning that the member 105 has member data 174 in the social access control network 172. While it is possible for the member 105 to be a non-human entity, authentication processes employed by the social access control system 150 can require real-time physical verification of identity, which a non-human entity is likely to fail.

An access point 130 can represent a location where wireless access to one or more associated entities 145 is provided. The access point 130 can be physically represented as an electronic device or virtually as a set of geospatial coordinates. The access point 130 can, mostly likely, be statically located (i.e., installed upon an immobile object, a fixed set of coordinates); however, mobile access points 130 (i.e., installed upon a moving object like a vehicle, one set out of a group of possible coordinate sets) can also fall under the purview of the present invention.

The access point 130 can utilize one or more transceivers 135 to provide wireless connectivity to a communication network 180. An access handler 140 can be a component of the access point 130 that represents the hardware and/or software installed to handle communications and execute instructions upon the associated entities 145. The access handler 140 can include the application programming interface (API) required to interface with the access point 130.

An entity 145, as used herein, can represent a physical or electronic asset that the access point 130 can affect via the access handler 140. The type and/or quantity of entities 145 associated with the access point 130 can vary based upon the type and/or configuration of the access point 130. Entities 145 can be published to one or more access points 130 of the social access control network 172.

For example, the access point 130 can be a smart home system like a SMART THINGS home automation hub. The entities 145 can be the various "smart" devices within the home that are connected to the SMART THINGS hub, including lighting, appliances, door locks, thermostats, and the like.

As another example, the access point 130 can be a commercially-available data beacon like those purchasable from GIMBAL and ESTIMOTE. Such data beacons can be designed to send data, the entities 145, to mobile devices 110 within a preset transmission distance; typically, the data beacon indiscriminately broadcasts to all mobile devices 110 in the transmission distance. In system 100, a data beacon access point 130 can be one purchased and installed by a member 105 for personal use as well as those maintained by corporate or business members 105 of the social access control network 172.

Further, a personal computing device or mobile device 110 can be configured to act as an access point 130, provided that it includes components that afford similar functionality of the transceiver 135 and access handler 140.

Yet another example can forego the need for a physical device and define the access point 130 using GPS coordinates. Such a virtual access point 130 can function similar to a data beacon, using an accessible wireless network to provide data.

The social access control system 150 can represent the hardware and/or software necessary to utilize the social access control network 172 for limiting interaction with the entities 145 of an access point 130 to the mobile devices 110 of designated members 105. The social access control system 150 can include a social network manager 155, an access control manager 165, a data store 170 for storing the social access control network 172, a social access client application 115, and the like.

The social access control network 172 can represent a social network of members 105 and access points 130. As such, the social access control network 172 can be comprised of member data 174 and access point definitions 178. The member data 174 can represent a variety of data about the member 105, which can be used for authentication purposes, as well as typical social media data (e.g., posts, comments, etc.) generated by the member 105.

The social network manager 155 can be the component configured to handle functions related to maintaining the social access control network 172. Such functions can include, but are not limited to, capturing/modifying member data 174 and access point definitions 178, messaging, creating relationships, and the like that is common in the Art related to social networks.

The social network manager 155 can include a point definition module 160 to create representations of the access points 130, the access point definitions 178, within the social access control network 172. An access point definition 178 can define the allowed interactions that can be performed with an access point 130 and/or its entities 145.

Interactions, as used herein, can represent communication between the mobile device and access point 130 as well as executable instructions that affect one or more entities 145. Examples of interactions can include, but are not limited to, downloading an entity 145, uploading an entity 145, modifying an entity 145, controlling operation of a device 145 connected to the access point 130, requesting permission to the access point 130, and the like. In addition to being defined by an owner of the access point 130, the types of interactions that can be performed with an access point 130 can vary based on the implementation of access point 130 as well as the entity 145 associated with the access point 130. That is, interactions appropriate to control of a smart house can be unavailable for selection when creating the access point definition 178 of a virtual access point 130.

The access point definition 178 can include one or more member associations 176. A member association 176 can be a reference to the member data 174 of a member 105 that has been allowed to perform one or more interactions with an access point 130.

For example, if Bob 105 allows Paul 105 to download an electronic copy of his class notes 145 from his access point 130, then the access point definition 178 of Bob's 105 access point 130 can include a member association 176 to Paul's 105 member data 174.

Additionally, parameters of the access point definition 178 can include, but are not limited to, the interactions allowed to be performed with the access point 130, the physical proximity 125 required for the mobile device 110 to perform each interaction, a time frame in which each interaction is available to be performed, and the like.

Depending upon the specific implementation of the social access control network 172, access points 130 can be treated like specialized members. Further, the social access control network 172 can use aggregate data structures for member data 174 (e.g., groups) to streamline assigning access permissions. Thus, a member association 176 can reference a group instead of each individual member data 174. This can allow access to the access point 130 to be dynamic without having to manually change individual member associations 176.

In another embodiment, the reference of a member association 176 can be reconfigured for storage within the member data 174. That is, the member data 174 can include references to the access point definitions 178 that the member 105 had been given access.

In another contemplated embodiment, the member association 176 can be implemented within the implicit structure of the social access control network 172. Access permission can be expressed within a uniform resource locator (URL) that is published to members 105 who belong to a specific group of the social access control network 172. Therefore, each member 105 can be provided access by virtue of membership to the group without an explicit member association 176.

The access control manager 165 can represent the component of the social access control system 150 configured to authenticate members 105 and determine what interactions that member 105 is allowed to perform upon the specific access point 130. The access control manager 165 can be configured to utilize a variety of security techniques and standards, as supported by the social access control system 150.

For example, access to the social access control network 172 can require simple identification data like a username and password. However, when a member 105 attempts to interact with an access point 130, the access control manager 165 can determine that the member 105 must submit a real-time photo to verify identify before the interaction can be performed. Such additional verification of identity can be contained within the access point definition 178 for the access point 130.

The social access client application 115 can represent the user interface that the member 105 uses to interact with both the social access control system 150 and the access point 130. The social access client application 115 can run on a mobile device 110 used by the member 105 attempting to interact with the access point 130.

The mobile device 110 can be a variety of portable electronic devices capable of wireless communications like a smartphone, a tablet computer, a laptop computer, or other smart device. The mobile device 110 can include one or more user identification components 120 that the member 105 can actively or passively capture identification data about the user and/or mobile device 110 that the social access control system 150 can use for authentication purposes. Examples of user identification components 120 can include, but are not limited to, a soft or hard keyboard, a microphone, a digital camera, a GPS transceiver, a biometric data collection program, a biometric data collection hardware attachment, and the like.

The social access client application 115 can enable and/or disable interactions that the member 105 can perform based on the physical proximity 125 of the mobile device 110 to the access point 130. The physical proximity 125 can represent the measured physical distance the mobile device 110 is from the access point 130. The physical proximity 125 can be determined based upon communication with the access point 130 or a location component 120 of the mobile device 110. The physical proximity 125 from the access point 130 required to perform an interaction can be defined in the access point definition 178.

It can be important to emphasize that the member 105 cannot interact with the access point 130 without the social access client application 115, regardless of other software or the capabilities of the mobile device 110. This can be an important distinction from the manner in which access points 130 conventional behave.

In the case of a smart home system 130, a specific, proprietary software application can be required for interaction. Typically, the owner of the house can have full access to this application. Allowing another person entry to the house, such as a repairman, to their smart house can require that they provide that person with full-access to the application or the door code. This is not a very secure means for providing access on a limited basis and would require the owner to change the application password or door code afterwards. The social access control system 150, however, can allow the homeowner 105 to allow the repairman 105 entry to the house without providing sensitive information that can be used later.

Firstly, the repairman 105 will need to be a member 105 of the social access control network 172. Then, the homeowner 150 can specify, in the access point definition 178, that the repairman 150 must be within two feet 125 of the door before the ability for the door to unlock is enabled within the social access client application 115. The homeowner 105 can additionally require that the repairman 105 provide a real-time photo using their mobile device 110 once the access point 130 is within the physical proximity 125 and prior to allowing the door to be unlocked.

It should be noted that multiple physical proximities 125 can be defined for an access point 130 and that different interactions can be available to different members 105 at those different physical proximities 125. For example, a member 105 not included in the member association 176 for the access point 130 can be provided the ability to request access, whereas an included member 105 can be provided access and even additional interactions as they move closer to the access point 130 (i.e., able to view a list of files at fifty feet, read-only viewing of a file at thirty feet, and able to download at ten feet).

As used herein, presented data store 170 can be a physical or virtual storage space configured to store digital information. Data store 170 can be physically implemented within any type of hardware including, but not limited to, a magnetic disk, an optical disk, a semiconductor memory, a digitally encoded plastic memory, a holographic memory, or any other recording medium. Data store 170 can be a stand-alone storage unit as well as a storage unit formed from a plurality of physical devices. Additionally, information can be stored within data store 170 in a variety of manners. For example, information can be stored within a database structure or can be stored within one or more files of a file storage system, where each file may or may not be indexed for information searching purposes. Further, data store 170 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
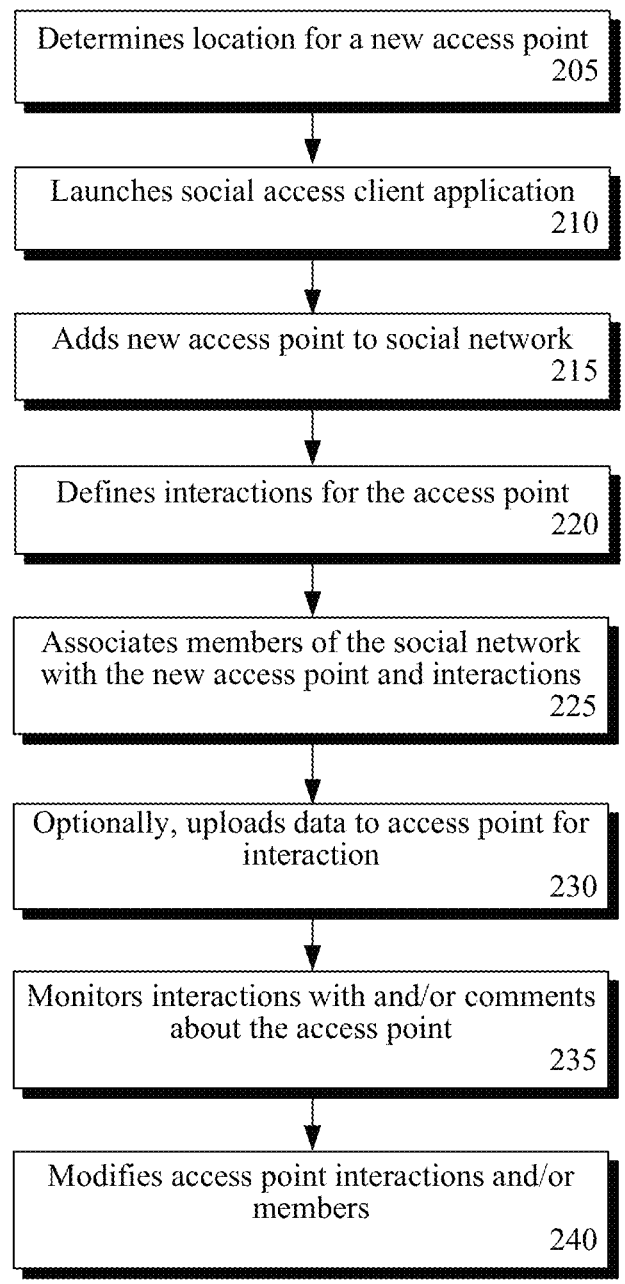
FIG. 2 is a flowchart of a method describing use of the social access control system from the perspective of an owner of an access point in accordance with embodiments of the inventive arrangements disclosed herein.

FIG. 2 is a flowchart of a method 200 describing use of the social access control system from the perspective of an owner of an access point in accordance with embodiments of the inventive arrangements disclosed herein. Method 200 can be performed within the context of system 100.

Method 200 can begin in step 205 where the owner can determine the location for a new access point. Step 205 can involve the installation of a physical device at the location. The social access client application can be launched on a mobile device in step 210. In step 215, the new access point can be added to the social access control network. Step 215 can require communication between the access point and the social access client application.

Interactions for the access point can then be defined in step 220. Step 220 can include the definition of physical proximities for the interactions. In step 225, members of the social access control network can be associated with the new access point and interactions. Steps 215 through 225 can generate the access point definition for the access point.

Optionally, in step 230, data can be uploaded to the access point for interaction. Step 230 can be focused towards the types of access points configured for data access. Step 230 may not apply to all types of access points like smart home systems.

The owner can be able to use the social access client application to monitor how the access point is being interacted with as well as any social media data posted about the access point in step 235. The social access control system can log data about interactions performed on the access point, which can be viewed by the user. Further, other members of the social access control network can leave comments or other types of communication for the owner and/or other members who may interact with the access point.

In step 240, the owner can modify the parameters of the access point using the social access client application. The owner can add/remove available interactions and/or the members who have access without having to configure the access point.

Figure 3:
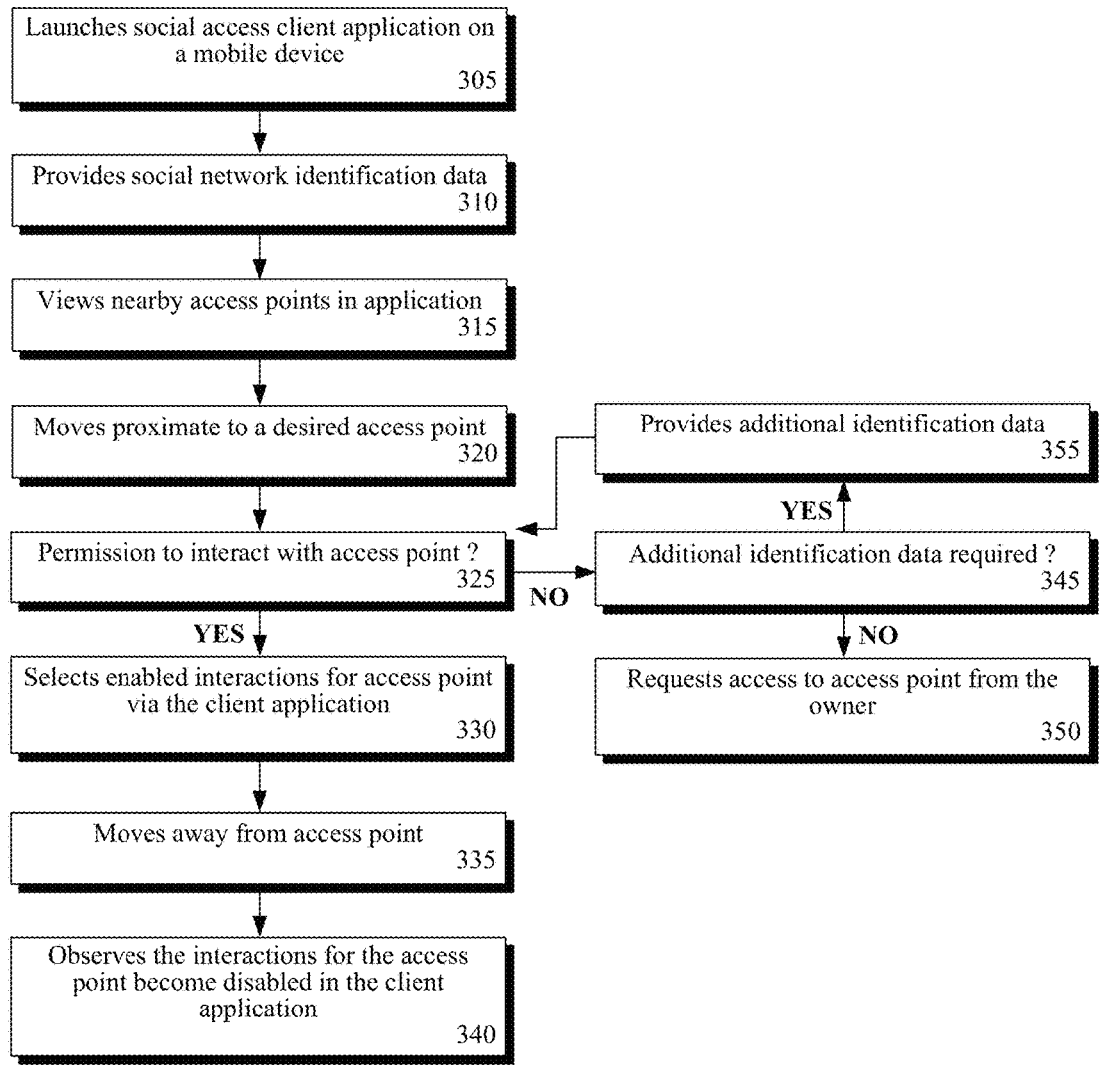
FIG. 3 is a flowchart of a method describing use of the social access control system from the perspective of a member in accordance with embodiments of the inventive arrangements disclosed herein.

FIG. 3 is a flowchart of a method 300 describing use of the social access control system from the perspective of a member in accordance with embodiments of the inventive arrangements disclosed herein. Method 300 can be performed within the context of system 100.

Method 300 can begin in step 305 where the member launches the social access client application on a mobile device. The member can then provide their social network identification data in step 310. In step 315, nearby access points can be viewed in the social access client application.

The member can move proximate to a desired access point in step 320. The social access client application can be configured to indicate the distance between the mobile device and the access point as well as prompt the member to move closer to the access point in order to interact with the access point.

In step 325, it can be determined if the member has permission to interact with the access point that they moved toward. When the member does not have permission to interact with the access point, step 345 can execute to determine if additional identification data is required from the member. When the access point requires additional identification data, the member can provide the additional identification data in step 355. From step 355, flow of method 300 can return to step 325 to reassess the permissions of the member.

When the access point does not require additional identification data, the member can request access to the access point from its owner in step 350. The member who does not have permission for an access point cannot interact with the access point even if they are using the social access client application and are within the proper physical proximity.

When it is determined that the member has permission to interact with the access point, step 330 can be performed where the member can then select enabled interactions in the social access client application to interact with the access point. Depending upon the specific implementation of the social access control system and/or social access client application, the interactions can be presented, but disabled prior to step 330.

In step 335, the member can move away from the access point. Once the member has moved out of the physical proximity for the access point, the member can observe that the interactions for the access point become disabled within the social access client application. This can cause interactions that are in-process to be paused or terminated.

Figure 4:
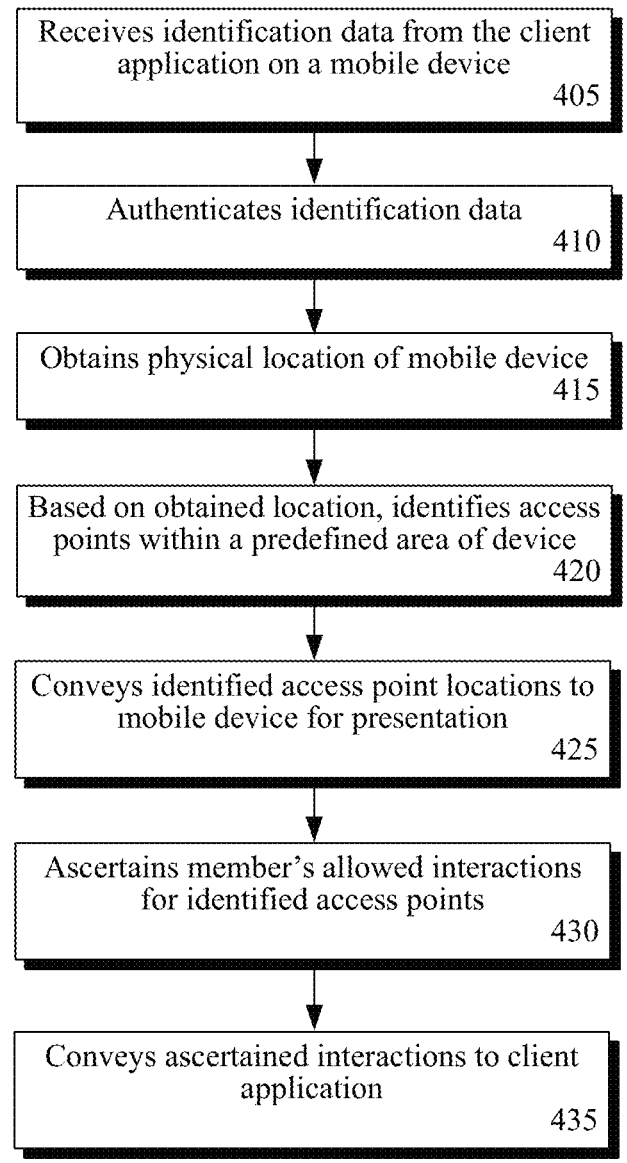
FIG. 4 is a flowchart of a method detailing the general operation of the social access control system in accordance with embodiments of the inventive arrangements disclosed herein.

FIG. 4 is a flowchart of a method 400 detailing the general operation of the social access control system in accordance with embodiments of the inventive arrangements disclosed herein. Method 400 can be performed within the context of system 100 and/or in conjunction with methods 200 and/or 300.

Method 400 can begin in step 405 where the social access control system can receive identification data from the social access client application on a mobile device. The identification data can then be authenticated in step 410. Step 410 can utilize the member data associated with member, which can include identifying data for their mobile device.

In step 415, the physical location of the mobile device can be obtained. Step 415 can utilize location services associated with the mobile device as well as distance determinations made by nearby access points or networks. Based on the obtained location, the access points within a predefined area of the mobile device can be identified in step 420. For example, only access points within ten miles of the mobile device can be initially identified for possible interaction. The predefined area can be a user-configurable parameter of the social access control system.

In step 425, the identified access points can be conveyed to the mobile device for presentation by the social access client application. The interactions allowed for the member for the identified access points can be ascertained in step 430. In step 435, the ascertained interactions can be conveyed to the social access client application for use.

In another embodiment, steps 430 and 435 can be performed on a per access point basis dependent upon the movement of the mobile device. That is, permission and interaction information for an access point can be determined and conveyed to the social access client application once the member starts to approach the access point.

Figure 5:
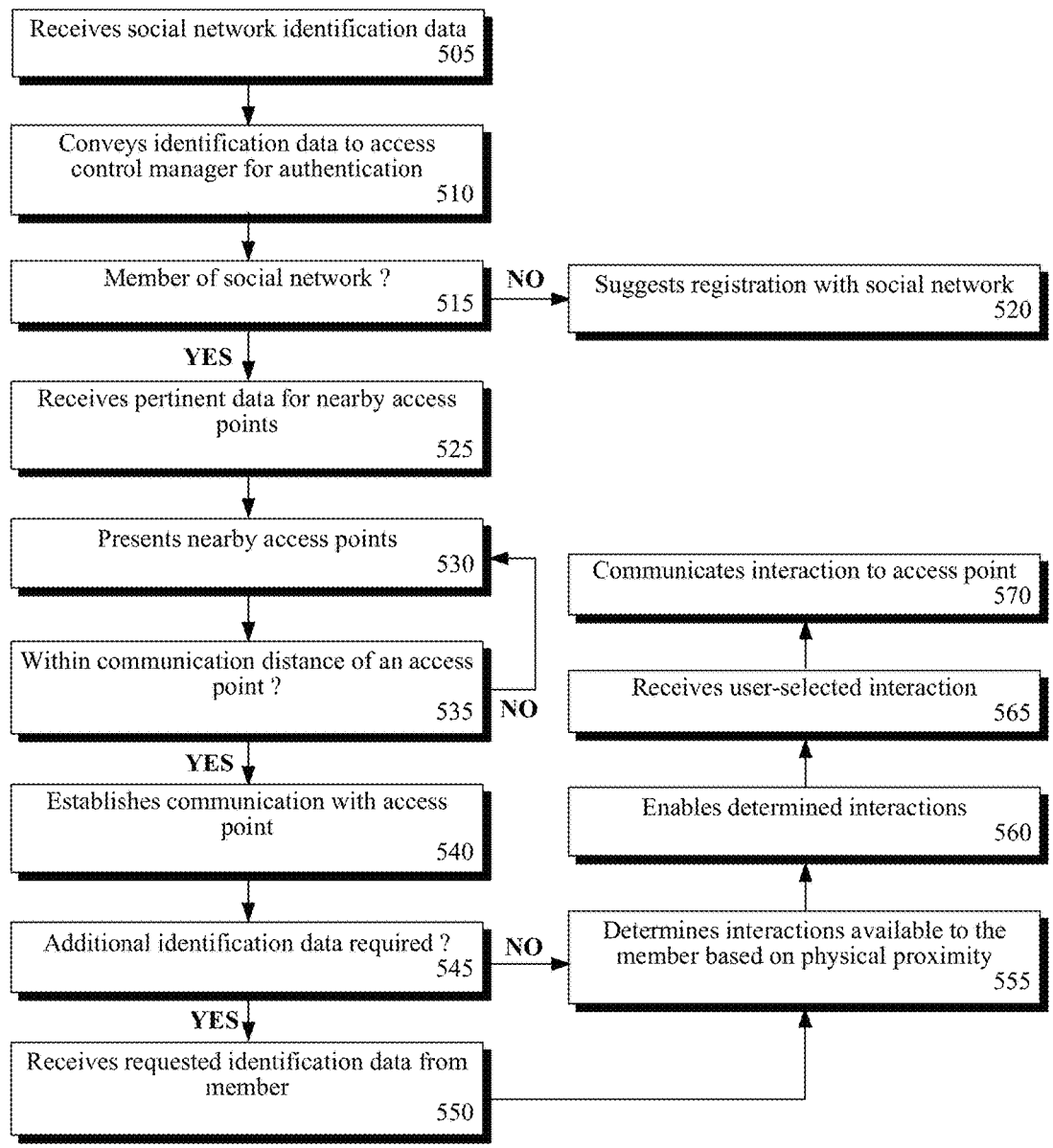
FIG. 5 is a flowchart of a method expressing the general operation of the social access client application in accordance with embodiments of the inventive arrangements disclosed herein.

FIG. 5 is a flowchart of a method 500 expressing the general operation of the social access client application in accordance with embodiments of the inventive arrangements disclosed herein. Method 500 can be performed within the context of system 100 and in conjunction with methods 200, 300, and/or 400.

Method 500 can begin in step 505 where the social access client application can receive social network identification data. The identification data can be conveyed to the access control manager for authentication in step 510. In step 515, it can be determined if the identification data belongs to a member of the social access control network.

When the identification data does not belong to a member, it can be suggested that that the person register with the social access control network in step 520. When the identification belongs to a valid member, step 525 can be performed where the social access client application receives pertinent data for nearby access points. The pertinent data can include location, distance, interactions, permissions, physical proximities, and the like.

The nearby access points can be presented within the social access client application in step 530. In step 535, it can be determined if the mobile device running the social access client application is within communication distance of an access point. The communication distance of an access point can vary based upon the type of hardware used in the access point as well as any obstacles in its vicinity. For example, an access point having a BLUETOOTH transceiver that utilizes the 802.11g protocol can have a maximum indoor communication distance of 125 ft. and a maximum outdoor distance of 460 ft.

When the mobile device is not within communication distance of an access point, flow of method 500 can return to step 530 to continue presenting the nearby access points. Looping back to step 530 can refresh or update the data being presented in the social access client application.

When the mobile device is within communication distance of an access point, step 540 can be executed where communication with the access point is established. The need for additional identification data for the access point can be determined in step 545.

When additional identification data is required, step 550 can be executed where the requested identification data is received from the member. Upon completion of step 550 or when additional identification data is not require, the interactions available to the member for the access point can be determined based upon the physical proximity of the mobile device to the access point in step 555.

In step 560, the determined interactions can be enabled within the social access client application. User-selection of an interaction can be received in step 565. In step 570, the user-selected interaction can be communicated to the access point.

Method 500 can conclude at step 570 due to the multitude of possible subsequent steps that can occur as a response to the specific interaction communicated to the access point in step 570. That is, what occurs after step 570 can depend on the type of interaction being performed, the type of entity involved, and/or the type of access point.

For example, if the interaction is a request for access to a data file, subsequent steps can detail the presentation of the data in the social access client application or other required presentation software application.

As another example, if the interaction is a command to unlock the door of a smart house, then the subsequent steps can outline how the unlock code is retrieved by the social access client application from the access point definition and sent to the smart house hub.

Figure 6:
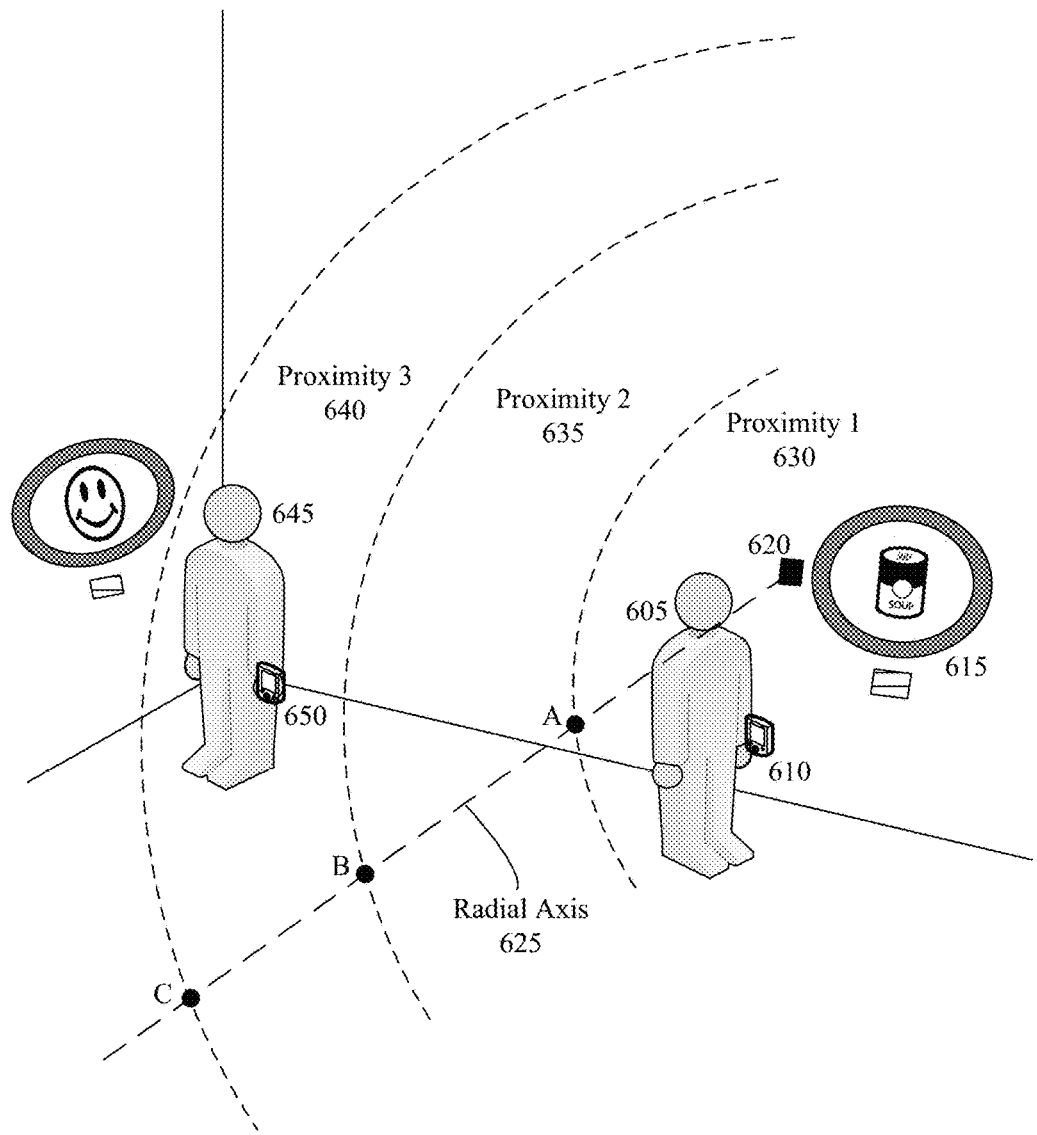
FIG. 6 is an illustration of the use of the social access control system to provide a guided tour in accordance with embodiments of the inventive arrangements disclosed herein.

FIG. 6 is an illustration 600 of the use of the social access control system to provide a guided tour in accordance with embodiments of the inventive arrangements disclosed herein. Illustration 600 can utilize the concepts taught by system 100 and methods 200, 300, 400, and 500.

In illustration 600, two members 605 and 645 of the social access control network can be in a room of an art museum. The museum can utilize the social access control system to provide visitors who are members 605 and 645 of their social access control network with a guided tour. Therefore, the museum can have access points 620 installed by designated art pieces 615.

Typically, the signal broadcast by the access point 620 can be spherical, as in this example, or elliptical in shape. The social access control system can further divide the broadcast area of the access point 620 into specific proximity sections 630, 635, and 640 along a given radial axis 625. The boundaries of each proximity section 630, 635, and 640 can be automatically defined by the social access control system or set/modified by the owner of the access point.

In this example, proximity section 1 630 can be bound by the access point 620, distance 0, and point A; proximity section 2 635 can be bound by point A and point B; and, proximity section 3 640 can be bound by point B and point C, the maximum broadcast distance.

Each proximity section 630, 635, and 640 can have different interactions available to the members 605 and 645 as well as require different levels of authentication. Member 645 can be standing within proximity section 3 640 of the access point 620. Being furthest from the access point 620, proximity section 3 640 may simply require membership to the museum's social access control network and only provide directional information to the access point 620 in the social access client application running on the member's 645 mobile device 650.

Proximity section 2 635 can require that the member 605 belong to a sub-group of the social access control network associated with access point 620. Proximity section 2 635 can allow the member 605 to view an explanation of the art piece 615 made by the museum staff. Authenticating to proximity section 1 630 can require photo identification of the member 605. Once authenticated, the member 605 can be allowed to post a question or personal review of the art piece 615 in the social access control network. It should be noted that member 645 cannot perform these actions unless they also have the proper permissions.

It should be also noted that the access requirements between the proximity sections 630, 635, and 640 can be cumulative. That is, in order to authenticate at proximity section 1 630, the member 605 can be required to have also authenticated themselves in proximity sections 2 and 3 635 and 640.

Figure 7:
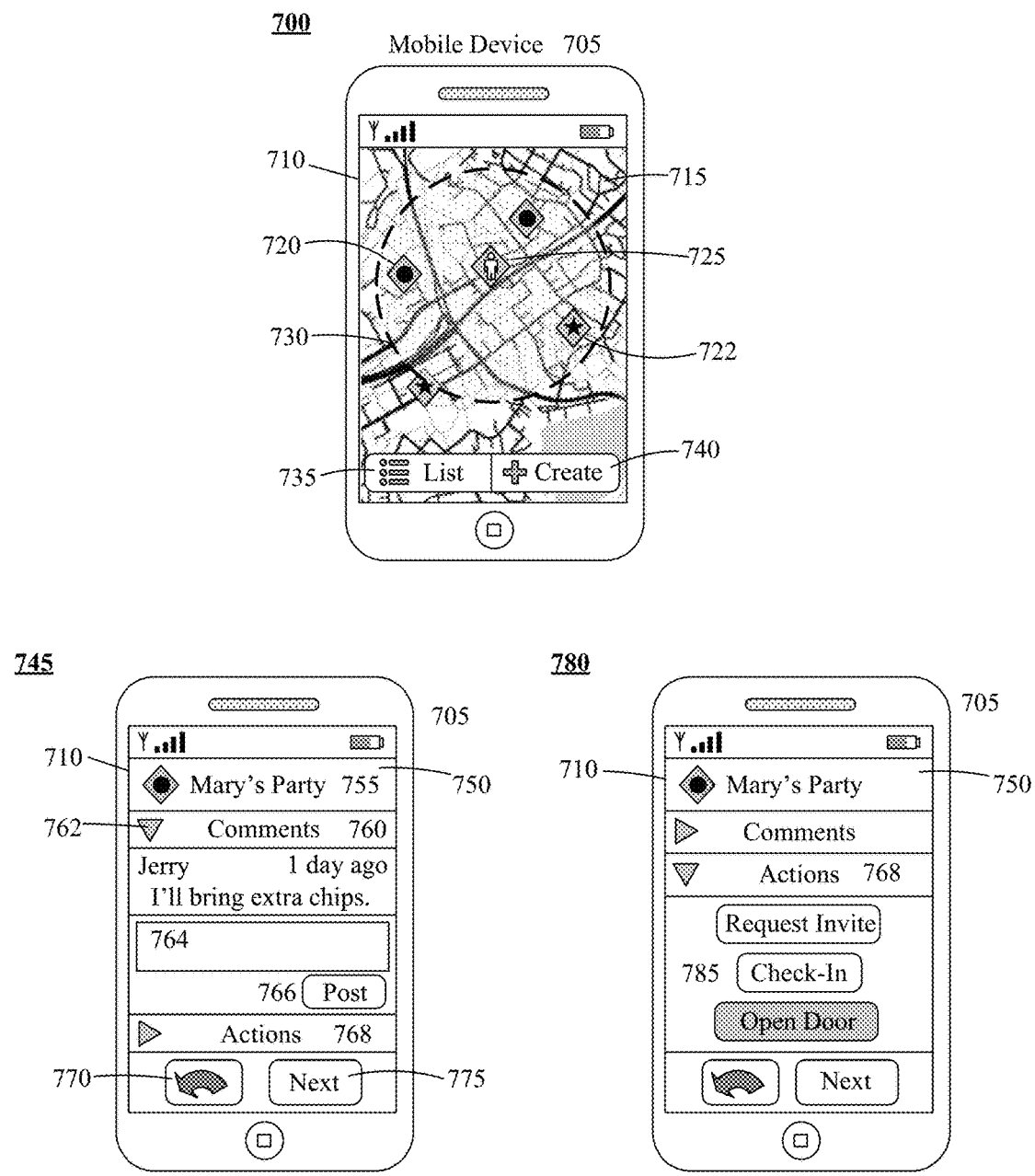
FIG. 7 depicts examples of views presented by the social access client application in accordance with embodiments of the inventive arrangements disclosed herein.

FIG. 7 depicts examples 700, 745, and 780 of views 715 and 750 presented by the social access client application in accordance with embodiments of the inventive arrangements disclosed herein. The examples 700 and 750 for the social access client application can be utilized within the context of system 100 and/or method 300.

These examples 700, 745, and 780 can be presented within the display 710 of the mobile device 705. The mobile device 705 can have a touch display 710 that allows user input.

Example 700 can show the initial map view 715 presented to a member upon authentication to the social access control network. The map view 715 can be a street map centered on the member's location indicated by a member icon 725. The limit of the predefined area 730 for presenting access points can be represented as a dashed circle centered on the member icon 725.

Icons 720 and 722 representing access points can be shown in the map view 715. Additional information about the access points like distance away can be graphically or textually presented near the icons 720 and 722. Further, the icons 720 and 722 can be graphically different to visually indicate the different permission levels that the member has to the access points. In this example 700, access points that the member has full access to can have a star icon 722, whereas icons 720 with a circle can represent access points where the member has basic or default access permission.

The graphics of and/or the information displayed with the icons 720 and 722 can also dynamically change based upon the physical proximity of the mobile device 705. For example, the color of the icon 720 and 722 can change from red (proximity provides no interaction) to yellow (proximity provides limited interaction) to green (proximity provides all interactions) as the member moves closer to the access point.

Actions of the social access client application that the member can perform in the map view 715 can be presented as well as implied by the user interface. In example 700, the map view 715 can present a list button 735 and a create button 740; implied actions can be those common to a touch-screen user interface like tapping an icon to select it or dragging the map to view a different area.

The list button 735 can present the visual information of the map view 715 in a list format, which can be helpful when the map is crowded with icons 720 and 722. The create button 740 can activate the point definition module of the social access control system to generate an access point definition and add a new access point to the social access control network.

Example 745 can show a simple user interface 750 for interacting with an access point 755, such as the one for Mary's Party. This user interface can be presented in response to the member selecting the icon 720 that correspond to the access point 755 for Mary's Party from the map view 715. In addition to the name of the access point 755, the user interface 750 can present the member with a section for viewing comments 760 made by other members of the social access control network, a section listing actions 768, a back button 770, and a next button 775.

Each section 760 and 768 of the user interface 750 can utilize a presentation control 762 to expand/collapse the sections, as is commonplace in mobile applications. The comments section 760 can present comments, or other social media data, that other members have associated with the particular access point 755. Additionally, this section 760 can include a text box 764 to accept input for a comment and a post button 766 that stores the text in the social access control network, associated with the access point 755.

The back and next buttons 770 and 775 can provide navigation functionality within the user interface 750. The back button 770 can return the member to the map view 715 or list view, whereas the next button 775 can present the next access point in the user interface 750.

Example 780 can illustrate the expanded actions section 768 of the user interface 750. In the actions section 768, each interaction allowed by the access point 755 can be represented as a selectable button 785. The buttons 785 corresponding to the interactions that the member currently has permission to perform can be enabled, white-colored, and those that cannot be currently performed can be disabled, gray-colored, within the user interface 750. As the member receives permission, disabled interaction buttons 785 can become enabled. Likewise, enabled interaction buttons 785 can become disabled should the member lose permission, such as by leaving the required physical proximity.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An access control system comprising:
  a plurality of access points acting as communication intermediaries for accessing at least one entity;
  a social access control system configured to limit interactions with the access point to mobile devices associated with members of a social access control network as defined by an owner of the access point, wherein said owner is a member of the social access control network, wherein a mobile device is required to be within a physical proximity, defined by the owner, of the access point, wherein the mobile devices of members of the social access control network lacking an association with the access point are unable to perform interactions that affect the at least one entity of the access point when within the physical proximity;
  wherein the social access control system further comprises:
    a social network manager configured to maintain the social access control network and authenticate member;
    a plurality of access point definitions for the plurality of access points that define at least interactions allowed for the access point, the physical proximity required for the mobile device to perform each interaction, members of the social access control network capable of performing each interaction, and a time frame in which each interaction is available to be performed;
    an access control manager configured to dynamically determine what interactions a member is allowed to perform with the access point; and
    a social access client application running on the mobile device that provides a user interface for performing user operations associated with the social network manager and access control manager, wherein the social access client application is required to communicate user-selected interactions with the access point, wherein said user-selected interactions coincide with the interactions determined by the access control manager.

2. The system of claim 1, wherein the interactions available for user-selection within the social access client application dynamically change based upon a physical distance of the mobile device from the access point.

3. The system of claim 1, wherein the access control manager further comprises:
  a point definition module configured to provide the owner of the access point a means for creating an access point definition within the social access client application.

4. The system of claim 1, wherein the access point represents one of an electronic communications device, a computing device, and a virtual device represented by a set of geospatial coordinates without a physical device.

5. The system of claim 4, wherein, when the access point is a smart home system, said at least one entity comprises at least one of lighting capable of wireless communication, a light switch capable of wireless communication, an electrical outlet capable of wireless communication, a dimmer switch capable of wireless communication, an electrical outlet plug-in module for household appliances capable of wireless communication, a digital camera capable of wireless communication, security system sensors capable of wireless communication, a smoke alarm capable of wireless communication, a carbon monoxide alarm capable of wireless communication, an electronic door lock capable of wireless communication, a garage door controller capable of wireless communication, a thermostat capable of wireless communication, an irrigation system capable of wireless communication, a fuel gauge capable of wireless communication, a water heater capable of wireless communication, an air conditioning system capable of wireless communication, motorized window treatments capable of wireless communication, a voice control module capable of wireless communication, and a clock capable of wireless communication.

6. The system of claim 4, wherein, when the access point is one of a data beacon and the virtual device, said at least one entity comprises digital data, wherein said digital data comprises at least one of a video file, an audio file, an image file, a text file, a multi-media file.

7. The system of claim 1, wherein the mobile device is capable of capturing user identification data, wherein said user identification data is captured using at least one of a soft or hard keyboard, a microphone, a digital camera, a biometric data collection program, and a biometric data collection hardware attachment.

8. An access control method comprising:
authenticating of identification data provided by a user by a social access control system for membership in a social access control network, wherein the identification data is entered in a social access client application operating on a mobile device of the user, wherein the social access control network is comprised of members and access points, wherein an access point is a communication intermediary to at least one entity at a geospatial location;
when the user's identification data is valid, obtaining a physical location of the mobile device;
identifying access points that are within a predefined area of the mobile device;
ascertaining interactions allowed for the user with the identified access points based upon an access point definition associated with the access point; and
permitting the user to perform ascertained interactions with the access point via the social access client application based upon a physical proximity of the mobile device to the geospatial location of the access point, wherein physical proximities required to perform an interaction are established in the access point definition, wherein a performance of interactions with the access point is disallowed without the social access client application;
adding of the access point to the social access control network via the social access client application by an owner of the access point, wherein the owner is a member of the social access control network, wherein, when the access point is an electronic device, addition of the access point occurs after installation of said electronic device at a physical location; and
creating the access point definition for the access point, wherein the access point definition defines at least interactions allowed for the access point, the physical proximity required for the mobile device to perform each interaction, members of the social access control network capable of performing each interaction, and a time frame in which each interaction is available to be performed.

9. The method of claim 8, wherein, prior to permitting the performance of interactions, said method further comprises:
requesting additional identification data from the user via the social access client application;
receiving the requested additional identification data;
validating the received additional identification data against at least one of social access control network data for the user and the access point definition for the access point;
when the additional identification data is valid, continuing with the permitting the performance of the interactions; and
when the additional identification data is invalid, restricting the permitting of interaction perform to only those interactions available to all members of the social access control network, if any, wherein the user is unable to affect the at least one entity associated with the access point.

10. The method of claim 8, wherein permitting the user to perform interactions further comprises:
presenting the interactions within the social access client application;
based upon the physical proximity of the mobile device to the access point and the access point definition, determining which interactions are executable by the user;
enabling the determined interactions within the social access client application;
disabling interactions other than the determined interactions within the social access client application; and
upon user-selection of an enabled interaction in the social access client application, executing the user-selected interaction upon the access point, wherein said execution affects at least one of the at least one entities associated with the access point.

11. The method of claim 10, wherein enabling interactions further comprises:
dynamically changing a graphical representation of the interaction within the social access client application.

12. The method of claim 10, further comprising:
detecting a change in the physical proximity of the mobile device to the access point; and
repeating the determining, enabling, disabling steps to reflect the change in physical proximity.

13. The method of claim 8, further comprising:
receiving social network data from members of the social access control network regarding the access point, wherein the social network data is one of a post, a comment, a reply, an uploaded file, an access request, and a feedback rating.

14. A computer program product comprising a non-transitory computer readable storage medium having computer usable program code embodied therewith, the computer usable program code comprising;
computer usable program code configured to authenticate identification data provided by a user to determine membership in a social access control network, wherein the identification data is entered in a social access client application operating on a mobile device of the user, wherein the social access control network is comprised of members and access points, wherein an access point is a communication intermediary for accessing at least one entity at a geospatial location;

computer usable program code configured to, when the user's identification data is valid, obtain a physical location of the mobile device;

computer usable program code configured to identify access points that are within a predefined area of the mobile device;

computer usable program code configured to ascertain interactions allowed for the user with the identified access points based upon an access point definition associated with the access point;

computer usable program code configured to permit the user to perform ascertained interactions with the access point via the social access client application based upon a physical proximity of the mobile device to a geospatial location of the access point, wherein physical proximities required to perform an interaction are established in the access point definition, wherein a performance of interactions with the access point is disallowed using other means;

computer usable program code configured to add the access point at the geospatial location to the social access control network via the user interface, wherein said addition of the access point is only allowed to be performed by an owner of the access point, wherein the owner is a member of the social access control network; and computer usable program code configured to create the access point definition for the access point, wherein the access point definition defines at least interactions allowed for the access point, the physical proximity required for the mobile device to perform each interaction, members of the social access control network capable of performing each interaction, and a time frame in which each interaction is available to be performed.

15. The computer program product of claim 14, wherein, prior to permitting the performance of interactions, said method further comprises:

computer usable program code configured to request additional identification data from the user via the user interface;

computer usable program code configured to receive the requested additional identification data;

computer usable program code configured to validate the received additional identification data against at least one of social access control network data for the user and the access point definition for the access point;

computer usable program code configured to, when the additional identification data is valid, continuing with the permitting the performance of the interactions; and computer usable program code configured to, when the additional identification data is invalid, restrict the permitting of interaction perform to only those interactions available to all members of the social access control network, if any, wherein the user is unable to affect the at least one entity associated with the access point.

16. The computer program product of claim 14, wherein permitting the user to perform interactions further comprises:

computer usable program code configured to present the interactions within a user interface;

computer usable program code configured to, based upon the physical proximity of the mobile device to the access point and the access point definition, determine which interactions are executable by the user;

computer usable program code configured to enable the determined interactions within the user interface;

computer usable program code configured to disable interactions other than the determined interactions within the user interface; and computer usable program code configured to, upon user-selection of an enabled interaction in the user interface, execute the user-selected interaction upon the access point, wherein said execution affects at least one of the at least one entities associated with the access point.

17. The computer program product of claim 16, further comprising:

computer usable program code configured to detect a change in the physical proximity of the mobile device to the access point; and computer usable program code configured to repeat the determining, enabling, disabling steps to reflect the change in physical proximity.

* * * * *